United States Patent [19]

Spike

[11] Patent Number: 4,747,186
[45] Date of Patent: May 31, 1988

[54] METHOD FOR STUFFING SAUSAGES

[76] Inventor: Robert V. Spike, 21 Woonona Avenue, Wahroonga, New South Wales, Australia, 2067

[21] Appl. No.: 863,258
[22] PCT Filed: Aug. 19, 1985
[86] PCT No.: PCT/AU85/00193
 § 371 Date: Apr. 10, 1986
 § 102(e) Date: Apr. 10, 1986
[87] PCT Pub. No.: WO86/01374
 PCT Pub. Date: Mar. 13, 1986

[30] Foreign Application Priority Data
 Aug. 28, 1984 [AU] Australia .............. PG6807

[51] Int. Cl.⁴ .............................. A22C 11/04
[52] U.S. Cl. .............................. 17/49; 17/38
[58] Field of Search .......... 17/38, 49, 33; 222/391

[56] References Cited
 U.S. PATENT DOCUMENTS 497,127  5/1893  Matthews et al. ........... 17/38
859,535  7/1907  Zimmers ..................... 17/38
2,340,433  2/1944  Skinner ...................... 222/391
2,933,221  4/1960  Rand et al. ................. 222/391
3,774,816  11/1973  Bratton ..................... 222/391

FOREIGN PATENT DOCUMENTS 2076473  12/1981  United Kingdom ........ 222/391

Primary Examiner—Willie G. Abercrombie
Attorney, Agent, or Firm—Darby & Darby

[57] ABSTRACT

The invention relates to a method and apparatus for stuffing sausages.

According to the method a sausage mix is loaded into the cylinder of a stuffing horn which has a piston operating therein with its piston rod extending outside the horn from one end and being provided with means to force the piston through the cylinder whereby the sausage mix is extruded through a nozzle in an end cap closing the other end of the cylinder into a sausage casing along said nozzle. When the casing is filled it is removed from the nozzle and severed into appropriate lengths.

4 Claims, 1 Drawing Sheet

U.S. Patent  May 31, 1988  4,747,186
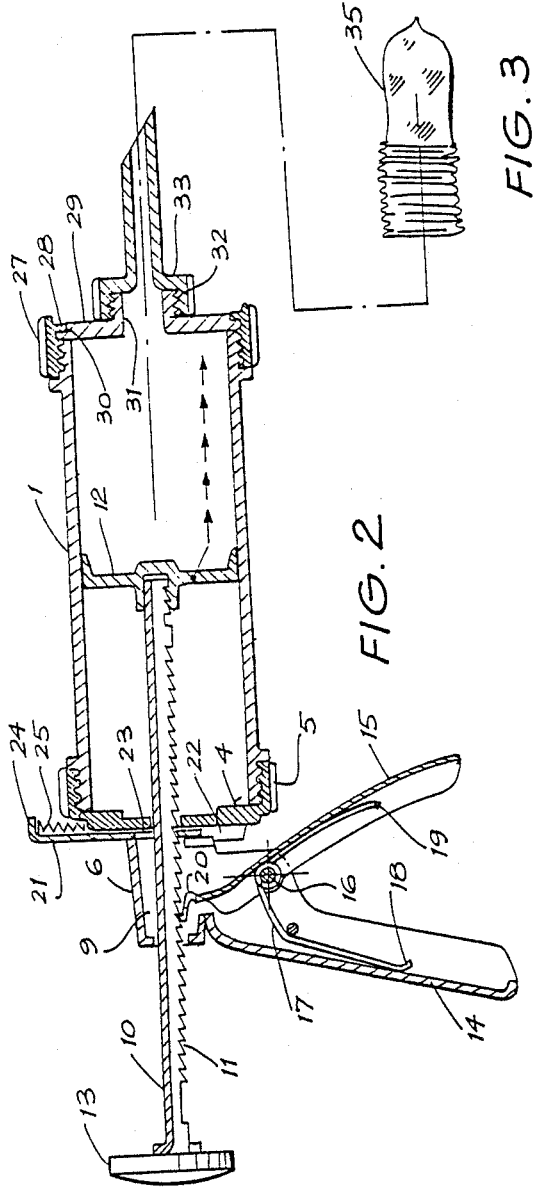
FIG. 2
FIG. 3
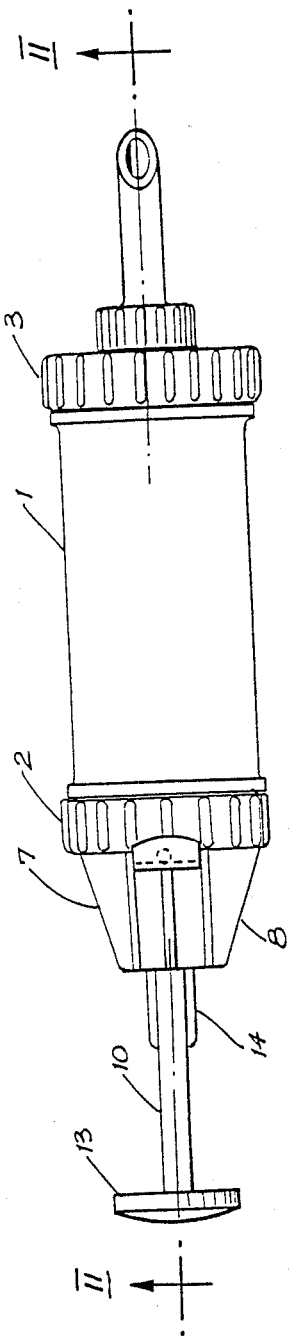
FIG. 1

METHOD FOR STUFFING SAUSAGES

This invention relates to a method and apparatus for stuffing sausages. Sausages have proved to be an extremely popular foodstuff. Many thousands of varieties of sausages are produced and they are consumed throughout most parts of the world.

Most sausages consumed today are produced commercially in large factories where the ingredients are stuffed into the casings with the aid of a stuffing horn as is well understood in the art.

In a typical commercial operation the sausage mix is extruded from a grinder into a stuffing horn which has its outlet positioned within a sausage casing which is retained on the horn by various means. When the casing has been filled it is removed from the horn and divided into appropriate lengths. Casing lengths of 15 to 20 centimeters are quite common and in consequence great care has to be exercised in retaining the casing on the horn until the whole length has been properly filled otherwise voids occur which are unacceptable in a commercially vended product.

Over recent years it has become customary for many users to produce their own sausages by using small domestic type grinders which have a stuffing horn attachment fitted thereto. Many of these grinders are manually operated and it is extremely difficult for one person to operate such equipment.

One particular problem is that the grinder has to be continuously fed with sausage mix, the operating handle of the grinder rotated while simultaneously holding the sausage casing on the stuffing horn. A multiplicity of operations therefore has to be performed simultaneously and in consequence it usually requires two persons to satifactorily produce sausages of good quality when using this type of equipment.

The use of electrically powered grinders has constituted some improvement however there still remains the problem of simultaneously feeding the grinder while retaining the sausage casing on the stuffing horn to provide a good quality sausage.

There has in consequence been a need to develop a method and apparatus for simply and economically producing sausages of good quality with equipment which is inexpensive and can be operated by unskilled persons.

The invention from one aspect therefore provides a method of stuffing a sausage casing which comprises the steps of loading a sausage mix into the cylinder of a stuffing horn, the cylinder having a piston inserted therein from one end with its piston rod extending outside the cylinder from said one end, the piston rod having actuating means in engagement therewith to force said piston through said cylinder towards the other end of said cylinder, said other end being closed by an end cap having a nozzle thereon which communicates with the interior of said cylinder, positioning and holding an empty sausage casing on said nozzle and operating said actuating means to force said piston through said cylinder whereby the sausage mix is extruded from said nozzle to fill said casing, removing the casing from said nozzle and dividing said filled casing into lengths to form a sausage.

The invention from another aspect comprises a horn for stuffing sausages consisting of a cylinder open at both ends, a piston inserted in one end thereof with its piston rod passing through a first end cap closing said one end, the piston rod having actuating means connected thereto to cause said piston to move through said cylinder to the other end thereof, a second end cap closing the other end of the cylinder, said second end cap having a nozzle extending therefrom and communicating with the interior of said cylinder.

Preferably the piston rod has rack teeth thereon in engagement with an actuating lever fixed to said first end cap, a locking plate in said first end cap and in engagement with said teeth to normally retain the piston in a selected position but movable on actuation of said lever which causes said piston to move through said cylinder to the other end thereof.

The invention from a still further aspect resides in a kit for the manufacture of sausages comprising a horn as hereinbefore set forth and packages of the following ingredients, namely:
(a) flavouring agents;
(b) seasoning agents;
(c) sausage casing;
the flavouring agents, seasoning agents when blended with a sausage mix and extruded through said horn into a sausage casing producing a void free mix which is compatible with the sausage casing.

The invention can be satisfactorily performed using sausage casings of conventional or synthetic material. It is however preferred to use a casing produced from collagen, collagen is produced from the corium layer of beef cattle, the fibres forming the corium layer are re-oriented to produce a film of edible protein which is extruded into tubes of predetermined diameters. Various types of collagen casings are produced. Those sold under the Trade Marks NATURIN and DEVRO are typical examples.

The invention will now be described with reference to the accompanying drawings which illustrate a preferred embodiment and in which:

FIG. 1 is a side elevation of a stuffing horn according to one embodiment of the invention;

FIG. 2 is a section on line II—II of FIG. 1; and

FIG. 3 is a side elevation of a sausage casing.

Referring now to the drawings the horn comprises a gun which includes a cylinder 1 closed at both ends by removable end caps 2 and 3. The cap 2 includes an end 4 and side wall 5. The side wall is threaded internally and is adapted to engage a corresponding thread on the cylinder 1 whereby the cap is removably secured to the cylinder.

The end 4 is provided with a boss 6 having spaced strengthening ribs 7 and 8. The boss, cap and strengthening ribs are formed integrally in a moulding operation as is well understood in the art and the boss and cap are provided with an axial passage 9 communicating with the interior of the cylinder.

Passing through the passage 9 is the piston rod 10. The piston rod is formed of channel section and opposite walls of the channel section are provided with rack teeth 11. A piston 12 is fixed to the inner end of the piston rod and the outer end is provided with a knob 13.

Extending from one side of the boss 6 is a handle 14. The handle has an operating lever 15 pivotally supported therein by a pivot pin 16 and a spring 17 has its ends 18 and 19 in engagement with the handle and lever respectively whereby the lever in its normal position is held away from the handle.

The inner end of the lever 15 is bent to form a hook end 20 the end of which is in register with and engages the rack teeth 11. A locking plate 21 passes through a slot 22 extending through the boss 6. The plate 21 is provided with an opening 23 which in one position of the plate registers with the passage 9 in the boss. The plate 21 is provided with a flange 24 which lies normal to the plane of the plate and extends in the direction of the cylinder 1 and a spring 25 positioned between the flange and the slot housing normally urges the plate into locking engagement with the teeth 11. When the lever 15 is depressed the hook section of the lever in engagement with the teeth 11 forces the piston rod 10 forward in cylinder 1. This causes the locking plate 21 to ride over the peak of the teeth 11 and lock behind the next succeeding tooth. Repeated manipulation of the lever 15 causes the piston to move forward in the barrel in increments determined by the pitch of the rack teeth 11.

The end cap 3 consists of an internally threaded open ended collar 27 provided with an inwardly directed flange 28 adjacent its outer end. A disc 29 provided with a stepped marginal portion 30 is adapted to seat against the flange 28 when the end cap is secured to the cylinder 1 by engagement of the thread on the collar with a corresponding thread on the cylinder 1.

The disc 29 has a boss 31 having an opening therethrough which communicates with the interior of the cylinder. The boss is provided with an external thread 32 which engages with a corresponding thread on the base 33 of a nozzle 34 whereby the nozzle is secured to the disc.

In use the sausage mix is ground to a selected degree of fineness in a suitable grinding machine which does not form part of the invention and additives such as flavouring agents and seasoning agents are then incorporated in the mix and blended therewith. The end cap 2 is then removed from the cylinder 1 and the mixture is then packed into the cylinder. The cap 2 is then secured to the cylinder with the piston 12 seating against the mix.

The sausage casing 35 which is illustrated in FIG. 3 is received from the manufacturer in a stacked condition as illustrated. The casing 35 is fitted over the nozzle 34 and retained thereon by finger pressure. The lever 15 is then manipulated by the user and this causes the piston to move forward in its cylinder in increments as described thereby forcing the mix into the casing. As the speed at which the mix is forced into the casing is governed by the speed of manipulation of the lever 15 it is possible to precisely control the rate of filling of the casing and in this way it is possible to easily and effectively form sausages of uniform dimensions and which are free from voids.

Suitable flavouring agents are natural powdered hickory smoke, meat enhancers, chicken enhancers and satay flavourings. Suitable flavourings are herbs, spices, salt, pepper, cereals flours etc.

Other additives such as colouring agents, meat extenders, emulsifiers and the like may be included to suit individual taste.

A kit of components for the manufacture of sausages is conveniently packed in a container which includes the stuffing horn previously described and packages containing:
(a) flavouring agents;
(b) seasoning agents; and
(c) sausage casing.

The flavouring and seasoning agents when blended with a sausage mix forming a cohesive extrudable mixture which on extrusion from the stuffing horn into a sausage casing forming a void free mix which is compatible with the casing.

It will be appreciated that other components may be included in the mix such as recipes, meat, chicken and fish extenders, vegetable concentrates and powders, meat concentrates and powders and any other additives which when combined with varied meat, poultry or fish produces a palatable mix which is suitable for manufacture into sausages.

I claim:

1. A method of stuffing a sausage casing which comprises the steps of:
    loading a sausage mix into the cylinder of a stuffing horn having at one end thereof a nozzle of sufficient length to accommodate a substantial length of axially compressed sausage casing, which nozzle communicates with the exterior of the cylinder, the stuffing horn being of a size and weight such that it may readily be held in one hand by a person using it, the cylinder having piston means therein actuable to force the sausage mix towards said one cylinder end and out of said nozzle, the horn having actuating means operable without the use of the other hand of the person for actuating said piston means;
    positioning an empty, axially compressed sausage casing on said nozzle with the other hand and holding it by finger pressure;
    operating said actuating means to force the sausage mix toward said nozzle, so that it is extruded from said nozzle to fill said casing and remove the casing from the nozzle; and
    dividing said filled casing into lengths to form a sausage.

2. The method as claimed in claim 1 wherein agents selected from the group comprising flavourings, seasoning agents, emulsifiers and meat extenders are included in said sausage mix prior to the loading of said mix into said cylinder.

3. A method of stuffing sausages as claimed in claim 1 wherein the sausage casing is a collagen casing.

4. The method of claim 1 performed with the aid of a stuffing horn wherein said piston means comprises a piston having a rod extending outside said cylinder from one end thereof, and actuating means coupled to the piston rod so as to force said piston means through said cylinder toward said other end upon manual operation by the one hand of the operator.

* * * * *